United States Patent Office 3,349,544
Patented Oct. 31, 1967

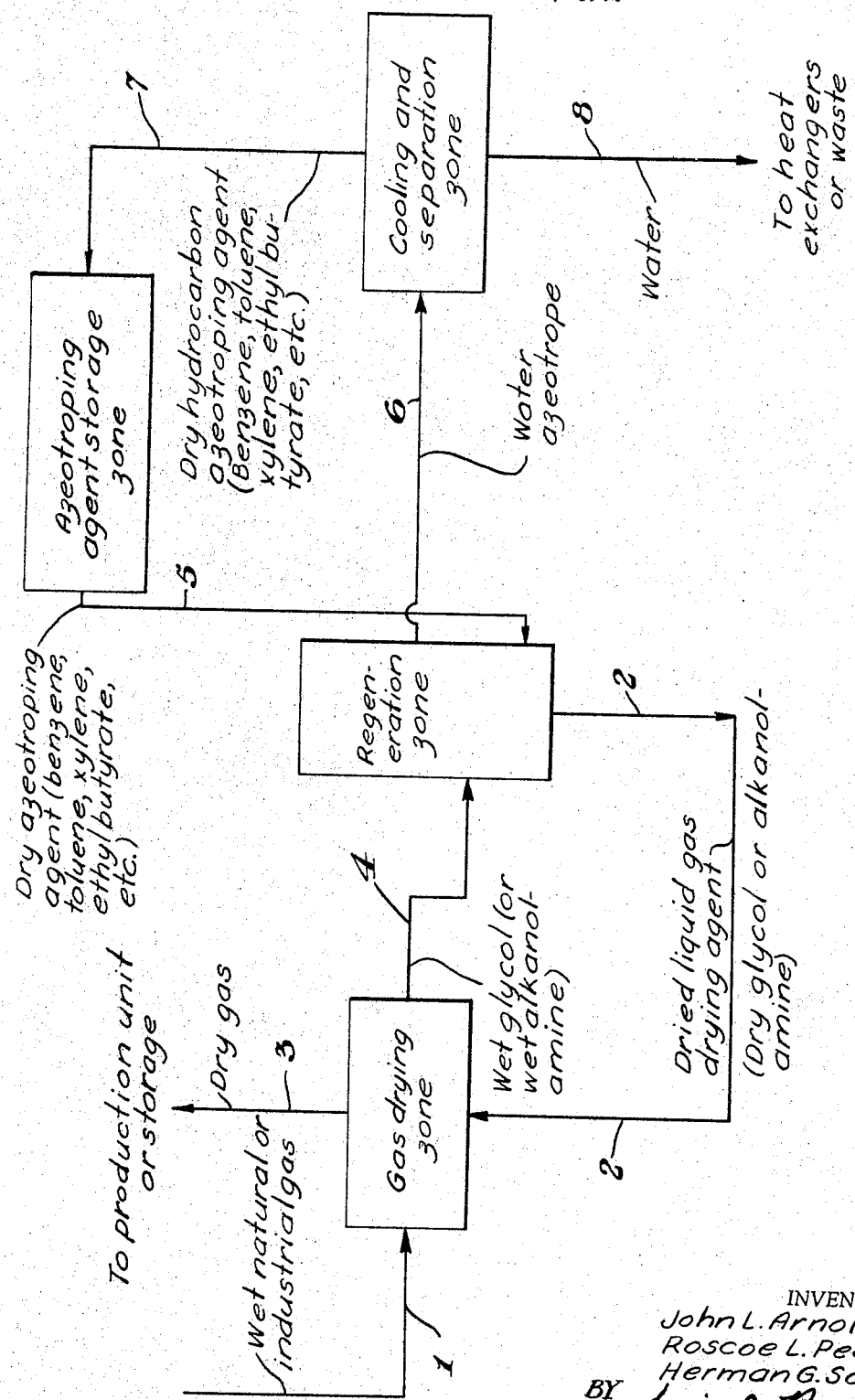

3,349,544
GAS DRYING PROCESS
John L. Arnold, Roscoe L. Pearce, and Herman G. Scholten, Midland, Mich., assignors to The Dow Chemical Company, Midland, Mich., a corporation of Delaware
Filed Jan. 28, 1966, Ser. No. 523,704
7 Claims. (Cl. 55—32)

ABSTRACT OF THE DISCLOSURE

Glycols of 2–8 C atoms and alkanol amines of 2–6 C atoms employed in drying water-wet gases are regenerated by introducing a water azeotroping agent beneath the surface of the drying agent, while maintaining the temperature in the regeneration zone above the vaporization temperature of the azeotroping agent and below the decomposition temperature of the drying agent, separating the water azeotrope and recycling the azeotroping agent through the system.

---

This invention relates to an improved process for the dehydration of water-wet gases using glycols and/or alkanolamines as drying agents.

When a drying agent such as a glycol or an alkanolamine is employed in conventional commercial gas drying units, water is removed from the aqueous glycol or alkanolamine by heating. The water vapor produced by heating is driven off and the regenerated glycol, alkanolamine, or other liquid drying agent, is again contacted with the wet gas. This method of drying gases, however, has serious disadvantages in commercial operations because simple heating of the liquid drying agent does not remove a sufficient amount of the water. The efficiency of the gas-drying operation is a function of the residual water in the regenerated desiccant (dehydrating agent). Raising the temperature during regeneration tends to drive off more moisture, but the use of excessive heat also promotes degradation of the dehydrating agent by the formation of pyrolysis products. These pyrolysis products in turn further reduce the effectiveness of the dehydrating agent and may contaminate the gas stream which is to be dried.

It has now been found that glycols of from 2 to 8 carbon atoms and/or alkanolamines of from 2 to 6 carbon atoms used for drying gases can be azeotropically regenerated in essentially a one-step azeotropic regeneration process. The regeneration may be accomplished while the gas-drying process operates continuously. The drying process may be used for any gas which does not react with the glycol or alkanolamine. In ordinary laboratory azeotropic distillations, water is gradually removed in small increments by the cyclic operation of the distillation apparatus. Such a system, however, is impractical for use in a large-scale commercial process because of the high eneregy requirements of the system. In a conventional azeotropic distillation, the liquid azeotroping agent forms a distinct layer (usually on the upper surface of the wet liquid). The only contact is at the interface of the two liquids. Much of the azeotroping agent is refluxed without contacting the wet liquid. According to the present invention, an amount of an azeotroping agent such as benzene, toluene, xylene, ethyl butyrate, or other material suitable for the formation of a low boiling azeotrope with water, is added beneath the surface of a hot aqueous solution of ethylene glycol, diethylene glycol, triethylene glycol, tetraethylene glycol, or an alkanolamine (such as aqueous monoethanolamine, diethanolamine, triethanolamine, etc.). The azeotroping agent which is added (1) is not materially miscible with water or the dehydrating agent, and (2) has a density less than the density of the aqueous glycol, aqueous alkanolamine, or aqueous glycol-alkanolamine mixture. The azeotroping agent is added in an amount sufficient to substantially reduce (or completely remove) the water dissolved in the glycol or alkanolamine. When aromatic hydrocarbon azeotroping agents are employed, the water is very effectively removed (i.e., the concentration of water is reduced to less than about one percent by weight). The azeotroping agent (introduced below the surface of the disiccant) migrates via density differential towards the surface of the liquid desiccant, vaporizing and forming the water azeotrope in situ. In addition to providing a mixing action to enhance the contact between the system being dried and the azeotroping agent, the transport of the azeotroping agent through the bulk fluid insures that sufficient contact time is provided to efficiently cause substantially all of the azeotroping agent to pick up water and form the water azeotrope before or during vaporization. The efficiency of the water removal is thus not limited to simple boundary contact of two immiscible liquids. The azeotroping agent may be contacted with the hot glycol or alkanolamine using any suitable means of diffusion so that both the azeotroping agent and the water azeotrope are vaporized in situ, below the liquid level of the bulk fluid being dehydrated. For example, the azeotroping agent may be added below the surface of the hot aqueous glycol or aqueous alkanolamine using a perforated tube or plate as a diffuser. One of the main advantages of the method of the present invention is that only an amount of azeotroping agent sufficient to remove essentially all of the water is necessary when the azeotroping agent is added at a sufficient distance beneath the surface to provide optimum contact. The need for the large amounts of azeotroping agent required for a cyclical laboratory azeotropic distillation is thus obviated. By reducing the amount of azeotroping agent that is added, the heat input requirements are correspondingly reduced. Almost no additional heat is required to volatilize any quantity of azeotroping agent which does not pick up water. The aqueous glycol and/or alkanolamine may be heated to any temperature of from above the vaporization temperature of the azeotroping agent to up to the decomposition temperature of the dehydrating agent. Ordinarily, temperatures of from about 250° to 425° F. are suitable.

The drawing is a schematic diagram of an embodiment of the improved gas-drying process of the invention. Wet industrial gas is sent via 1 to the Gas Drying Zone. A liquid gas-drying agent (such as ethylene glycol, diethylene glycol, triethylene glycol, monoethanolamine, diethanolamine, etc.) is sent via 2 to the Gas Drying Zone and is contacted with the gas from 1 in counter-current extractive relationship. Dry gas (i.e., gas with a smaller moisture content than the gas entering the Gas Drying Zone) is removed from the Gas Drying Zone through exit 3. The liquid gas-drying agent (which now contains the additional moisture removed from the wet gas) is removed from the Gas Drying Zone through line 4 and sent to the Regeneration Zone. The water-rich gas-drying agent is heated to a suitable temperature within the Regeneration Zone. Since any temperature below the decomposition point of the glycol and/or alkanolamine may be used, this temperature may be from about 250° to 425° F., depending upon the particular drying agent. For example, using ethylene glycol, the Regeneration Zone may be heated to from 300° to about 329° F.; using diethylene glycol, the Regeneration Zone can be heated from 300° up to about 350° F. (preferably about 340°–350° F.); using triethylene glycol, the temperature may be up to from about 300° to 385° F. and is usually from about 350° to 385° F.; with tetraethylene glycol, any temperature of from 300° to 425° F. may be used; and with monoethanolamine, the temperature may be from about 280° to 300°–305° F., depending on the particular azeotroping agent. The azeotroping agent (which has a density less than that of the dehydrating agent and is substantially non-miscible with the dehydrating agent) is added via line 5 to the Regeneration Zone beneath the surface of the hot liquid drying agent which is to be regenerated by reduction of the water content. The azeotroping agent preferably has a density which is at least .02 gram/milliliter less than the density of the wet dehydrating agent at the particular regeneration temperature. The water azeotrope which forms is removed in vapor form from the Regeneration Zone via line 6 and sent to a Cooling and Separation Zone where the water azeotrope is condensed. The dehydrated gas drying agent (desiccant) is removed from the Regeneration Zone via line 2 and returned to the Gas Drying Zone. The water azeotrope which is condensed in the Cooling and Separation Zone is separated into two liquid layers (water and immiscible organic liquid azeotroping agent). The organic azetroping agent is then sent via line 7 to a Storage Zone which feeds through line 5 back to the Regeneration Zone. The water is removed through line 8 and may be either sent to waste or utilized in the heat exchangers of the system.

The removal of the water from the hot aqueous glycol or aqueous alkanolamine is thus substantially instantaneous for any given concentration of water. It is thus not necessary to gradually remove the water in several cyclical operations. The water azeotrope (in vapor form) is easily separated from the hot (liquid) glycol or alkanolamine by conventional means and a fresh charge of aqueous glycol or aqueous alkanolamine from the gas-drying operation is subsequently fed to the regeneration zone. The vaporized water azeotrope is then sent to a condenser or other cooling apparatus and the water separated in liquid form from the azeotroping agent. The azeotroping agent is used again to dry a new charge of hot, wet glycol or alkanolamine in the regeneration zone.

The bulk of the water in the desiccant may be removed by ordinary distillation techniques. The process of the present invention is particularly advantageous for drying aqueous glycol or aqueous alkanolamine solutions which contain from 2.0–6.0 up to about 2.0–10.0 percent water. Removal of at least a portion of this last small amount of water from the glycols or alkanolamines greatly increases their effectiveness as industrial gas dehydrating agents.

According to a particularly advantageous embodiment of the process of the invention wherein diethylene glycol is employed as the gas-drying agent, the wet diethylene glycol is heated to a temperature of about 325° F. This initial heating step removes a portion of the water leaving a solution of diethylene glycol containing up to about 2.0–5.0 percent (weight) of water. To this hot solution is added an amount of toluene sufficient to combine with most of the water present in the partially regenerated diethylene glycol. The toluene is added beneath the surface of the hot diethylene glycol (preferably at a point close to the bottom) through a perforated diffuser or sparger, so that the toluene vaporizes within the glycol phase. Upon vaporization, the bubbles of toluene vapor and toluene-water azeotrope vapor move through the bulk of the diethylene glycol phase so that almost all of the toluene is effectively utilized to form a water-toluene azeotrope. The combined effect of using only a slight excess of toluene (i.e., up to about 10 percent by weight based upon the total weight required to remove all of the residual water) and the efficient vaporization of the toluene beneath the surface of the diethylene glycol gives a severalfold increase in the rate of water removal by the formation of a toluene-water azeotrope. This improvement is not obtained when large amounts of azeotroping agent are employed. For example, the laboratory method makes use of a large excess of toluene which materially reduces the reflux temperature within the regeneration zone and causes additional quantities of material to be cycled unnecessarily. The net result is a waste of energy and less effective formation of the water-toluene azeotrope. The process of the present invention results in a single pass operation which is able to provide essentially complete water stripping of the diethylene glycol.

Since the presence of large amounts of azeotroping agent [such as benzene, toluene, xylene (o-, m- or p-dimethylbenzene), etc.] in the regeneration zone tends to reduce the over-all efficiency of the process, it is preferable to meter the exact amount of azeotroping agent required in the regeneration zone. This can be accomplished automatically by proper design of the separator to permit automatic adjustment of the feed rate of the organic azeotroping agent. In this manner, the circulation rate of the azeotroping agent can be adjusted to be proportional to the amount of water present in the wet glycol and/or wet alkanolamine which is being sent to the regeneration zone. An increase in the total water present in the regeneration zone thus automatically increases both the amount of azeotroping agent which is fed to the regeneration zone and the amount of heat supplied to the regeneration zone. Conversely, a decrease in the total water which is to be removed from the regeneration zone results in a decrease in the amount of azeotroping agent required to remove this water and a corresponding decrease in the amount of heat supplied to the regeneration zone. With synchronized control of the azeotroping agent feed rate and the heat supply to the regeneration zone (both dependent upon the total amount of water and glycol or alkanolamine), the process can be operated continuously.

Another advantage of the process of the invention is that it is adaptable to existing gas-drying apparatus with a minimum of equipment and/or process modifications.

The following examples are submitted for the purpose of illustration only and are not to be construed as limiting the scope of the invention in any way.

EXAMPLE I

A sample of 150 grams of diethylene glycol (90 percent by weight diethylene glycol, 10 percent by weight water) was placed in a flask equipped with a refluxing column. The temperature of the flask was brought to 349° F. under a nitrogen atmosphere. At this temperature, 10 milliliters of water had been removed, leaving a total of 5 milliliters of water remaining in the flask. Toluene was introduced beneath the surface of the hot aqueous diethylene glycol at the rate of 2–3 milliliters per minute until a total of 40 milliliters of toluene had been added. The vapors from the reflux column were fed to a side-arm receiver equipped with a water-cooled condenser and the toluene-water azeotrope was condensed. Condensed toluene was not recycled to the flask. The residue in the flask contained 99.91 percent by weight of diethylene glycol.

EXAMPLE II

Natural gas (normal dew point of from 70°–75° F., equivalent to 42 lbs. $H_2O$/million standard cubic feet (MM s.c.f.) to 50 lbs. $H_2O$/MM s.c.f.) was dried in a conventional commercial gas dehydrator using triethylene glycol as the drying agent. A standard cubic foot of gas is measured at 14.7 p.s.i.a. at 60° F. The gas was dried by countercurrent contact with triethylene glycol in a vertical drying column. The triethylene glycol was circulated through the system at a rate of 24 gallons per hour. The natural gas was fed to the drying column at a temperature of 72° F. under a pressure of 495 p.s.i.g. and was flowing at a rate of 1.335 million standard cubic feet (MM s.c.f.) per day. After removal of the dried gas, the wet triethylene glycol was removed from the drying column and piped to the regenerator where it was heated to 350° F. to evaporate a portion of the water. Under this conventional method of operation, the lean triethylene glycol (triethylene glycol obtained from the regeneration zone after heating to 350° F.) contained about 2.9 percent by weight of water. The dried natural gas had a gas dew point of 18° F. corresponding to a water content of 6.7 pounds of water per million standard cubic feet (6.7 lbs. $H_2O$/MM s.c.f.) of gas.

Toluene was then injected beneath the surface of the triethylene glycol (at 350° F.) in the glycol regenerator. The toluene injection rate was 4 gallons (U.S.) per hour. Within one hour (the time required to compensate for triethylene glycol inventory in pipe lines), the water content of the effluent natural gas from the drying column was reduced to 5.9 lbs. $H_2O$/MM s.c.f. (dew point, 15° F.) and within 2 hours, to 5.2 lbs. $H_2O$/MM s.c.f. (dew point, 12° F.). In a similar experiment but using a toluene injection rate of 5.0 gallons per hour, the amount of water in the natural gas was reduced to 5.2 lbs. $H_2O$/MM s.c.f. (dew point, 12° F.) within one hour. The gas dew point was not indicative of equilibrium values owing to the equipment design. The absorber (gas drying column) contained only three trays. Six or seven trays would be required to more fully benefit from the higher triethylene glycol concentration of 99.66 percent which was the value obtained by the completion of the modified field operation in a single day.

EXAMPLE III

Using equipment and a procedure similar to that of Example I, a sample of 200 grams of aqueous monoethanolamine (94.6 percent by weight monoethanolamine, 5.4 percent by weight of water) was heated to about 300°–305° F. The water content of the monoethanolamine was then approximately 5.0 percent by weight. A 60 milliliter sample of ethyl butyrate was injected below the surface of the hot monoethanolamine. The amount of water remaining in the monoethanolamine after addition of the ethyl butyrate and separation of the water-ethyl butyrate azeotrope was about 2.4 percent by weight.

EXAMPLE IV

Using equipment and a procedure similar to that of Example I, a sample of 500 milliliters of aqueous ethylene glycol (95 percent by weight ethylene glycol, 5 percent by weight water) was heated to 300° F. A total of 186 grams (214 milliliters) of toluene was added beneath the surface of the aqueous ethylene glycol at a flow rate of 3 milliliters of toluene per minute. The distillation was completed in one hour and ten minutes. A nitrogen atmosphere was maintained in the system during distillation. The concentration of the water remaining in the ethylene glycol after distillation was 0.7 percent by weight.

EXAMPLE V

Using an apparatus and procedure similar to Example IV, a 500 milliliter sample of aqueous monoethanolamine (95 percent by weight of monoethanolamine, 5 percent by weight of water) was heated to 280° F. A total of 325 milliliters of benzene was added beneath the surface of the hot aqueous monoethanolamine at a rate of 3.0 milliliters per minute. After completion of the distillation step, the concentration of the water in the monoethanolamine was reduced to 1.3 percent by weight.

EXAMPLE VI

In a manner similar to the preceding example (but using a two foot, 22 plate bubble cap column), a sample of 500 grams of aqueous diethanolamine (95 percent by weight diethanolamine, 5 percent by weight water) was placed in a distillation flask and heated to about 300° F. Prior to the distillation step, the system was purged with nitrogen. No nitrogen was employed during the distillation. A sintered glass tube was placed beneath the surface of the hot aqueous diethanolamine and a total of 283 grams (320 milliliters) of benzene was added at a feed rate of 1.5 milliliters of benzene per minute. The amount of water remaining in the diethanolamine after distillation amounted to 0.6 percent by weight.

We claim as our invention:

1. In a method of drying a water-wet gas by contacting said gas with a liquid drying agent (A) selected from the group consisting of a glycol of from 2 to 8 carbon atoms and an alkanolamine of no more than 6 carbon atoms, wherein (A) is heated to remove water prior to reuse as a gas-drying agent, the improvement which comprises introducing an organic water azeotroping agent beneath the surface of (A) when the average temperature of (A) is above the vaporization temperature of the azeotroping agent and below the thermal decomposition temperature of (A) in an amount sufficient to form a water azeotrope with the residual water, said water azeotrope having a boiling point no greater than the thermal decomposition temperature of (A), then removing said water azeotrope from (A) separating said azeotroping agent from the water, and reintroducing said azeotroping agent beneath the surface of (A).

2. The method of claim 1 wherein the temperature of (A) is maintained at from about 250° to 425° F.

3. The method of claim 1 wherein:
   (a) the drying agent (A) is diethylene glycol,
   (b) the azeotroping agent is a member selected from the group consisting of benzene, toluene and a xylene, and
   (c) the temperature of (A) is maintained at from about 300° to 350° F.

4. The method of claim 1 wherein:
   (a) the drying agent (A) is triethylene glycol,
   (b) the azeotroping agent is a member selected from the group consisting of benzene, toluene and a xylene, and
   (c) the maximum temperature of (A) is no more than 425° F.

5. The method of claim 1 wherein:
   (a) the drying agent (A) is monoethanolamine,
   (b) the azeotroping agent is ethyl butyrate, and
   (c) the temperature of (A) is maintained at from about 300° to 305° F.

6. The method of claim 1 wherein:
   (a) the drying agent (A) is ethylene glycol,
   (b) the azeotroping agent is toluene, and
   (c) the temperature of (A) is maintained at from about 300° to 329° F.

7. The method of claim 1 wherein:
   (a) the drying agent (A) is triethanolamine,
   (b) the azeotroping agent is a member selected from the group consisting of benzene, toluene and a xylene, and
   (c) the temperature of (A) is maintained at from about 250° to 425° F.

References Cited

UNITED STATES PATENTS

| | | | |
|---|---|---|---|
| 2,455,803 | 12/1948 | Pierotti | 203—69 |
| 2,552,911 | 5/1951 | Steitz | 203—69 |
| 2,691,624 | 10/1954 | Challis | 203—69 |
| 2,903,465 | 9/1959 | Suter et al. | 203—69 |
| 3,105,748 | 10/1963 | Stahl | 55—32 |
| 3,321,890 | 5/1967 | Barnhart | 55—32 |

REUBEN FRIEDMAN, *Primary Examiner.*

C. N. HART, *Assistant Examiner.*